US006971212B1

(12) United States Patent
Johnson et al.

(10) Patent No.: US 6,971,212 B1
(45) Date of Patent: Dec. 6, 2005

(54) BRACE ARM

(75) Inventors: R. Michael Johnson, Orangeburg, SC (US); Timothy J. Whitman, Orangeburg, SC (US); Greg B. Campbell, Cordova, SC (US)

(73) Assignees: Cox Industries, Inc., Orangeburg, SC (US); Whitman Mold, Inc., Orangeburg, SC (US)

( * ) Notice: Subject to any disclaimer, the term of this patent is extended or adjusted under 35 U.S.C. 154(b) by 0 days.

(21) Appl. No.: 10/360,008

(22) Filed: Feb. 6, 2003

(51) Int. Cl.$^7$ .............................................. E04H 12/00
(52) U.S. Cl. .................. 52/651.02; 52/739.1; 403/269
(58) Field of Search ........................ 52/651.02, 651.01, 52/736.2, 736.1, 739.1, 720.1; 403/265, 268, 403/269

(56) References Cited

U.S. PATENT DOCUMENTS

| | | | | |
|---|---|---|---|---|
| 2,056,366 A | * | 10/1936 | Richards et al. | 52/697 |
| 2,906,379 A | * | 9/1959 | Smalley | 52/697 |
| 3,468,571 A | | 9/1969 | Farmer | |
| 3,978,188 A | | 8/1976 | Schoenebeck | |
| 4,147,443 A | | 4/1979 | Skobel | |
| 4,418,732 A | | 12/1983 | Kolonia | |
| 4,492,129 A | | 1/1985 | Hasegawa | |
| 4,596,105 A | | 6/1986 | Farmer | |
| 4,742,661 A | | 5/1988 | Burtelson | |
| 4,839,405 A | * | 6/1989 | Speelman et al. | 524/99 |
| 4,948,924 A | | 8/1990 | Farmer | |
| 5,141,353 A | * | 8/1992 | Meredith et al. | 403/267 |
| 5,954,447 A | * | 9/1999 | Bathon | 403/267 |
| 6,706,790 B1 | * | 3/2004 | Berliet | 524/255 |

FOREIGN PATENT DOCUMENTS

| | | | |
|---|---|---|---|
| DE | 19924108 | * | 11/2000 |

* cited by examiner

*Primary Examiner*—Laurie K. Cranmer
(74) *Attorney, Agent, or Firm*—Leatherwood Walker Todd & Mann, P.C.; Thomas W. Epting

(57) ABSTRACT

A brace arm for connection to a crossarm of a utility pole. The brace arm includes an elongated wooden strut having a pole bracket at one end and a crossarm bracket at the other end thereof. Each of the brackets are injection molded of plastic or other polymeric material to the end of the strut. The injection molding of the brackets to the ends of the strut causes the brackets to be firmly fixed to the strut. Each end of the strut includes a passage therethrough for receipt of mold material during the injection molding process, and each bracket includes a finger of material which extends into the passage in each end of the strut.

24 Claims, 3 Drawing Sheets

BRACE ARM

BACKGROUND OF THE INVENTION

This invention relates generally to a brace arm for bracing an object, and in particular, for bracing utility pole cross members.

Conventional utility poles include cross members, or, crossarms, to which insulators are attached for carrying utility lines. The crossarms are braced to the main, typically vertical, utility pole using brace arms.

Conventional brace arms may be made of galvanized steel, which provides strength, but which may corrode over time and provide electrical conductivity safety risks for lineman.

Conventional brace arms may also be made entirely of treated wood, but these arms tend to become weak after being exposed to the elements over prolonged period of times.

Certain variations of brace arms have been patented, and include U.S. Pat. Nos. 3,468,571 and 4,596,105, both of which were issued to Marion R. Farmer, and U.S. Pat. No. 4,742,661, which was issued to Frederick W. Burtelson.

SUMMARY OF THE INVENTION

Generally, the present invention includes a brace arm for bracing an object. More particularly, the present invention includes a brace arm for connection to a crossarm of a utility pole, the brace arm having an elongated strut with a first end and a second end substantially opposite the first end. The first end and the second end of the strut each define a receptacle therein. Also provided is a first bracket constructed of polymeric material molded to the first end. The first bracket defines an integral projection extending into and substantially filling the receptacle in the first end of the wood strut. Further, the first bracket includes an outwardly projecting tongue configured for fastening to the utility pole.

More specifically, the brace arm also preferably includes a second bracket, also constructed of polymeric material, molded to the second end of the strut, and the second bracket defines an integral projection extending into and substantially filling the receptacle in the second end of the strut.

A utility line support device and a method of injection molding a polymeric bracket onto wood also forms part of the present invention.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
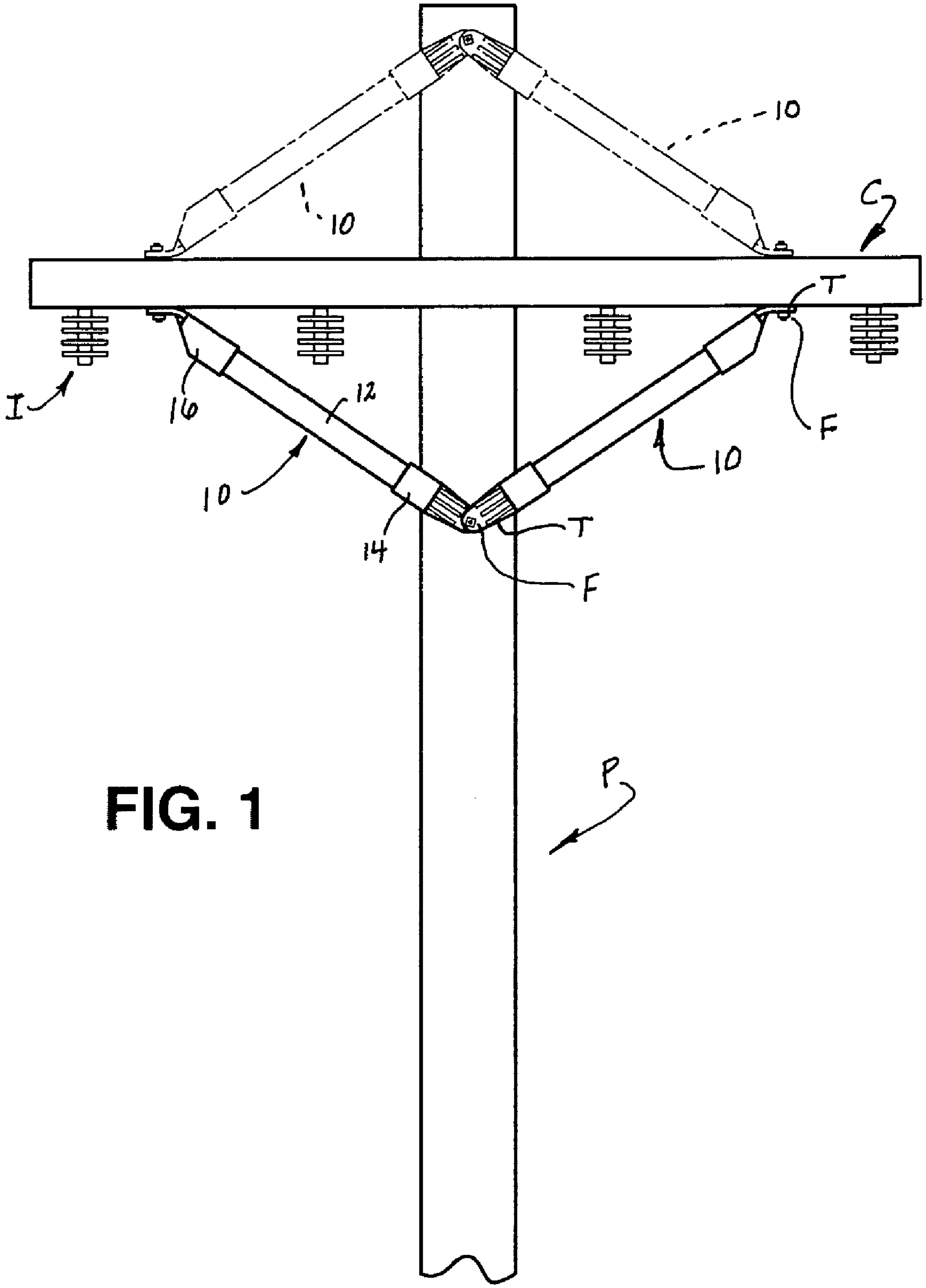
FIG. 1 is an elevational view of brace arms constructed in accordance with the present invention and installed on a utility pole and a crossarm.

The accompanying drawings and the description which follows set forth this invention in its preferred embodiment. However, it is contemplated that persons generally familiar with utility poles, crossarms, and brace arms for bracing objects will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the brace arm of the present invention is indicated generally in the figures by reference character 10.

Turning to the figures, FIG. 1 illustrates brace arms 10 constructed in accordance with the present invention attached to and spanning between a utility pole, generally P, and a crossarm, or cross member, generally C. Brace arms 10 are generally connected to the pole P at a position below crossarm C, and span upwardly to the crossarm C. However, as shown in phantom lines in FIG. 1, brace arms 10 can also be used to support and stabilize crossarm C by being attached to pole P at a position above the height of crossarm C. Fasteners, generally F, such as bolts, screws, nails, etc., may be used to attach brace arms 10 to pole P and crossarm C. Brace arms 10 each include a strut member 12 having at one end a pole bracket 14 and at the other end a crossarm bracket 16.

Crossarm C provides support for utility line (not shown) which could be electrical power lines, telephone lines, cable TV lines, communication lines, etc. Such lines may be attached to crossarm C at various positions, and may be held by conventional insulators, generally I, attached to crossarm C.

Figure 2A:
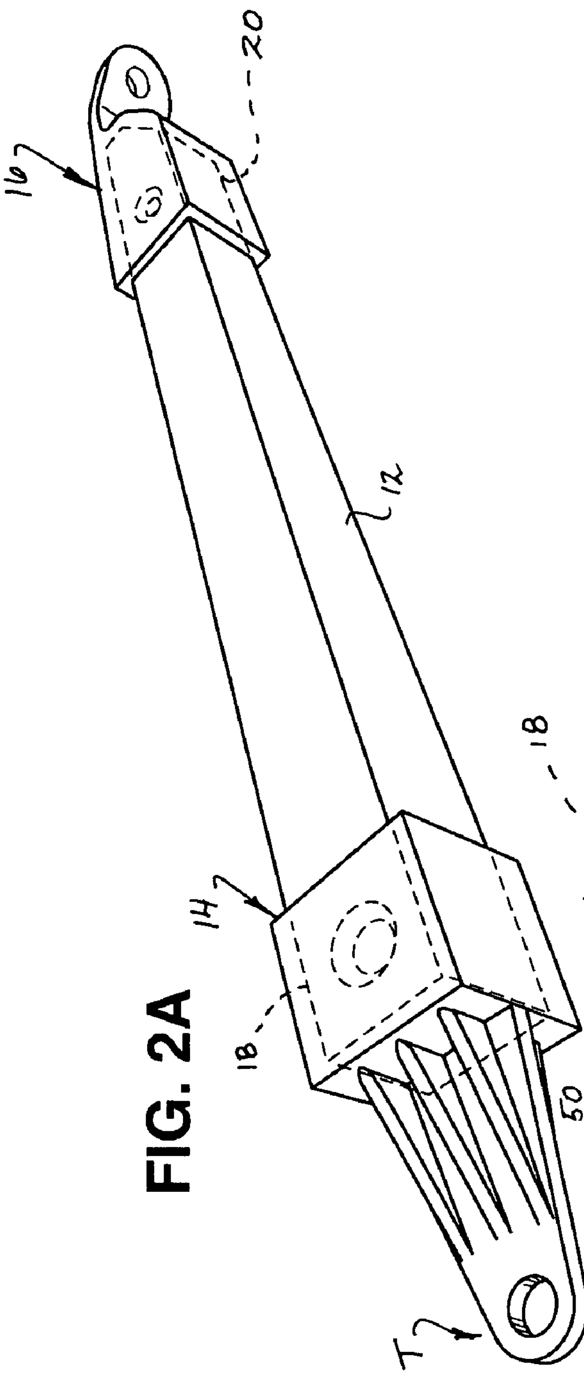
FIG. 2A is a perspective view of a brace arm shown in FIG. 1.

As shown in FIG. 2A, pole bracket 14 and crossarm bracket 16 are preferably molded to the ends 18, 20 of strut 12 with polymeric material, such as injection grade thermoplastic material. The type of polymeric material used could vary depending on the application of brace arm 10, and could be nylon, or a nylon derivative product, and could be glass-filled if desired. It is anticipated that brackets 14, 16 constructed of approximately thirty percent glass-filled nylon will offer promising results. It is also anticipated that brackets 14, 16 of nylon (or a nylon derivative) would function quite well without any glass filling.

Figure 2B:
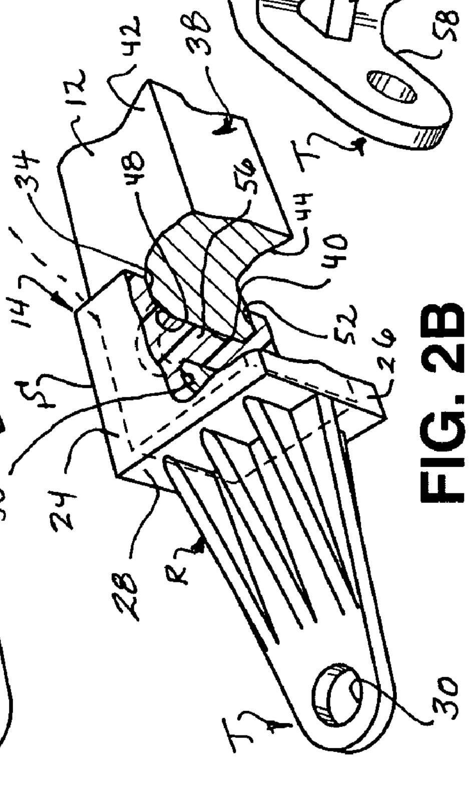
FIG. 2B is a partial perspective view, with parts cut away, of one end of the brace arm shown in FIG. 2A.

FIG. 2B illustrates pole bracket 14 in detail. Bracket 14 includes a box-shaped skirt portion, generally S, having four side walls, only two sidewalls 24, 26 being shown, and a base surface 28. Extending outwardly generally from the midline of base surface 28 is a tongue portion, generally T, having a fastener hole 30 defined therein for receipt of a fastener F. Triangular ribs, generally R, are provided between tongue T and base surface 28, on both sides of tongue T for strengthening tongue T.

The central location of tongue T along the midline of base surface 28 allows for either side of tongue T to be adjacent pole P during use. This, in effect, allows brace arm 10 to be reserved and used on either the right or left side of pole P for supporting crossarm C.

Pole bracket 14 is formed in a process discussed in more detail below, wherein pole bracket 14 is injection molded to end 18 of strut 12 during an injection molding process. In such process, the interior surfaces of skirt, generally 34, conform to and bind to the five exterior surfaces (four sides plus the extreme end surface), generally 38, of strut end 18. Additionally, strut end 18 preferably includes a receptacle 40 extending through end 18 between sides 42 and 44. Receptacle 40 is generally cylindrical, and includes a chamfered portion 48, which could be formed in a counter-boring process, in sides 42 and 44 of strut end 18.

During the injection molding process, the polymeric material flows into receptacle 40 such that sidewalls 50 and 52 of skirt S of bracket 18 are connected to one another via an integral projection, or, finger 56 which substantially fills and extends through receptacle 40. The interconnection of finger 56 of bracket 14 and receptacle 40 of strut end 18 serves to further secure bracket 14 to strut 12. This can be particularly desirable in the event brace arms 10 are placed in tension during their service life.

Figure 2C:
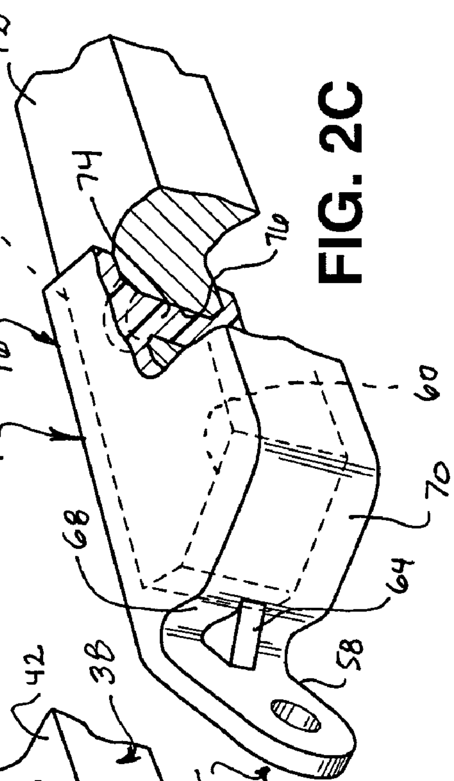
FIG. 2C is a partial perspective view, with parts cut away, of the other end of the brace arm shown in FIG. 2A.

FIG. 2C illustrates crossarm bracket 16 in more detail. Crossarm bracket 16 is also molded to strut end 20 preferably using the same process and material as discussed above with respect to pole bracket 14. Because crossarm bracket 16 must accommodate an angular approach of strut 12 with respect to crossarm C, and particularly the underside of crossarm C, crossarm bracket 16 includes an angled tongue 58 which extends at a generally acute angle with respect to the length of strut 12. In recognition of this, strut end 20 includes an angled face 60 for providing clearance in the angular match-up of strut end 20 to crossarm C. The angled face 60 provides a relief area for use in attaching tongue 58 to crossarm C with a fastener F via fastener hole 62.

Tongue 58 is elbow-shaped with respect to strut 12 and includes a molded-in support member 64 spanning between tongue 58 and a base surface 68 of bracket 16. Base surface 68 includes an angled contour face 70 conforming to angled face 60 of strut 12.

Crossarm bracket 16 also includes a skirt portion S having skirt walls, generally 72, and an integral finger 74 extending through a receptacle 76 defined in strut end 20 which, as discussed above in regards to pole bracket 14, serves to secure crossarm bracket 16 to strut 12.

Figure 3:
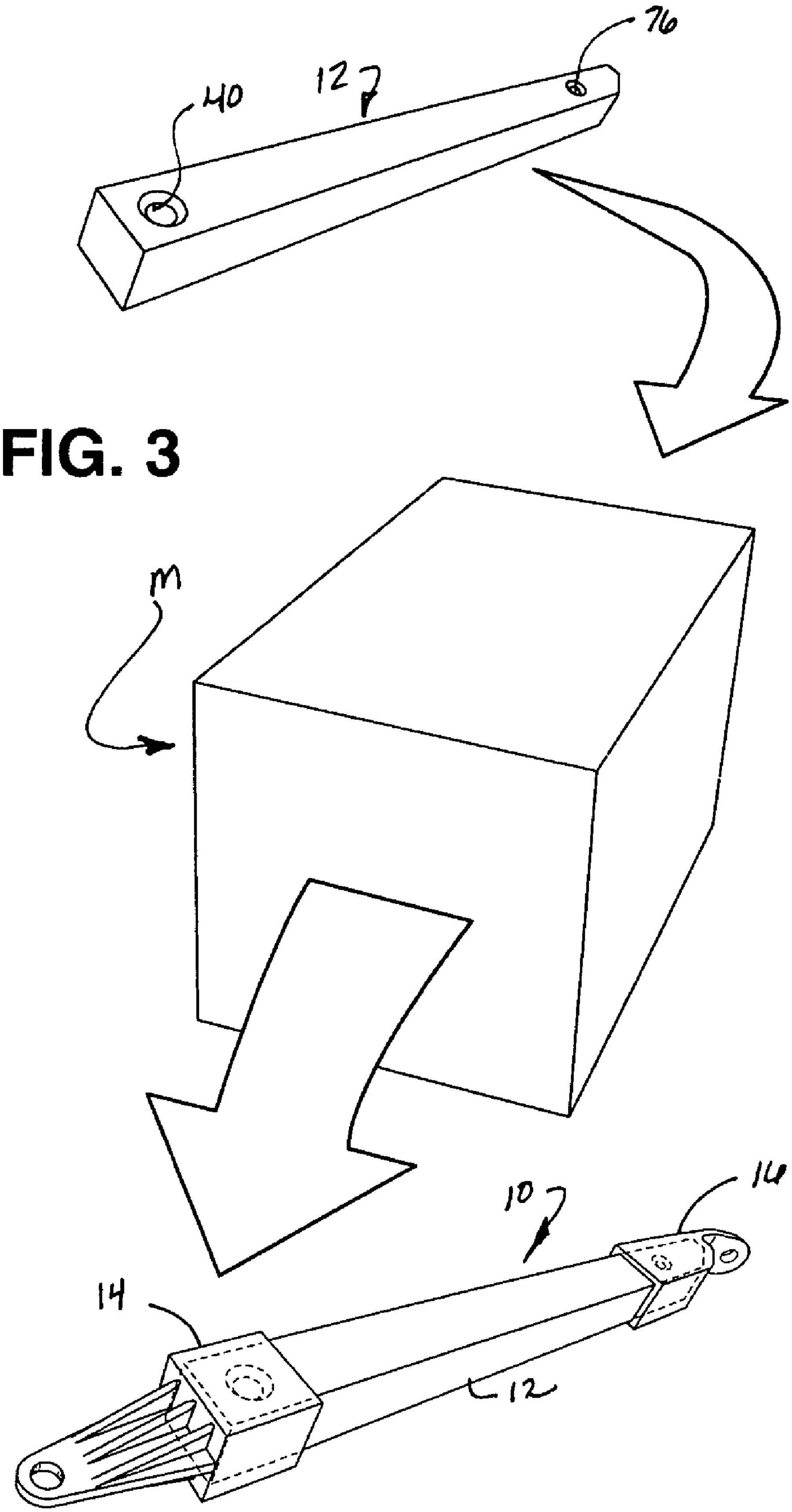
FIG. 3 is a schematic view of a process for making a brace arm in accordance with the present invention.

FIG. 3 illustrates a process for forming brace arms 10. Strut 12 is preferably constructed of wood, such as Douglas Fir, Southern Pine, or Aptong, although it is to be understood that materials other than wood could be used to construct strut 12, such as metal, plastic, ceramic, glass, etc. Use of a wooden strut 12 and polymeric brackets 14, 16 yields a composite brace arm 12 having the strength and non-conductivity of wood and the weather resistance, strength, and non-conductivity of a polymeric material.

In the case of a wood strut 12, receptacles 40 and 76 are formed therein by drilling, boring, counter-boring, etc., and strut 12 is inserted into a mold (not shown) of an injection molding machine, generally M. Once in place, injection molding material, such as a polymeric material (preferably injection mold grade thermoplastic) is introduced into the mold such that the molding material conforms to the profile of the mold. One mold may provide the profile of pole bracket 14, and another mold could provide the profile of crossarm bracket 16.

During the injection molding process, the mold material, which preferably includes ultraviolet (UV) inhibiters, is provided at a pressure and temperature sufficient for allowing the mold material to flow into and substantially fill the mold and the applicable receptacle of strut 12. It has been found that a molding temperature of 400 to 500 degrees Fahrenheit works satisfactorily when using injection mold grade thermoplastic.

If, for example, pole bracket 14 is molded first on strut 12, then after such bracket has been molded, strut 12 could be removed, and the other end 20 of strut 12 inserted into a second mold (not shown) which would then mold the crossarm bracket 16 profile onto end 20 of strut 12. The molding process for crossarm bracket 16 would be generally the same as for bracket 14, with the molding material temperature and pressure being sufficient such that the molding material is driven into and substantially fills the mold and receptacle 76.

Instead of molding one bracket at a time onto strut 12, molding machine M could be configured such that both brackets 14 and 16 were molded simultaneously onto ends 18, 20, respectively of strut 12, if desired.

It is anticipated that composite brace arm 10 will provide longer life than an ordinary brace arm constructed of wood alone, and will provide the strength approaching that of a galvanized brace arm.

Brace arm 10 should also improve the basic insulating level ("BIL") in electric power line applications, which, consequently, improves the safety of a linemen, by reducing his or her exposure to electrical arcing.

Although illustrated herein as being used for connection to a utility pole and crossarm, it is to be understood that the present invention is not limited to such an application, and could find other more general uses for bracing objects.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A utility line support device for supporting a utility line above the ground, comprising:

a pole member for placement in the ground;

a crossarm attached to and extending outwardly from the pole member for carrying the utility line;

at least one elongated brace arm spanning between said pole and said crossarm, said brace arm having a first end and a second end opposite said first end;

a first bracket constructed of polymeric material attached to said first end of said brace arm, said first bracket being connected to said pole and including a skirt portion generally surrounding said first end of said brace arm; said skirt portion defining an integral projection connected to and extending through a substantial portion of said first end of said brace arm; and said polymeric material being injection grade thermoplastic having ultraviolet inhibiters.

2. The utility line support device as defined in claim 1, further comprising:

a second bracket constructed of polymeric material molded to said second end of said brace arm, said second bracket being connected to said crossarm.

3. The utility line support device as defined in claim 1, wherein said first end of said brace arm defines a receptacle, and wherein said elongated projection extends into said receptacle.

4. The utility line support device as defined in claim 1, wherein:

said first end of said brace arm including a first surface and a second surface opposite to said first surface;

said skirt defining a first side adjacent said first surface, and a second side adjacent said second surface;

said first end of said brace arm defining a passage extending from said first surface to said second surface; and said integral projection extending through said passage of said first end of said brace arm.

5. The utility line support device as defined in claim 1, further comprising a fastener for attaching said first bracket to said pole, said first bracket including an outwardly extending tongue, and said tongue defining a fastener opening for receipt of said fastener.

6. The utility line support device as defined in claim 1, further comprising:

a second bracket constructed of polymeric material molded to said second end of said brace arm, said second bracket being connected to said crossarm;

a fastener for attaching said second bracket to said crossarm;

said second bracket including an outwardly extending tongue; and said tongue defining a fastener opening for receipt of said fastener.

7. The utility line support device as defined in claim 1, further comprising a second bracket constructed of polymeric material molded to said second end of said brace arm; said second bracket including an outwardly extending tongue, and said tongue extending at an acute angle with respect to the brace arm.

8. The utility line support device as defined in claim 1, wherein said second end of said brace arm includes a first angled portion, and wherein said second polymeric bracket includes a second angled portion corresponding to and substantially the same angle as said first angled portion.

9. A brace arm for connection to a crossarm of a utility pole, the brace arm comprising:

an elongated wooden strut having a first end and a second end substantially opposite said first end;

a first bracket constructed of polymeric material attached to said first end of said wooden strut and including a skirt portion generally surrounding said first end of said wooden strut; said skirt portion defining an integral projection connected to and extending through a substantial portion of said first end of said wooden strut; said polymeric material being injection grade thermoplastic having ultraviolet inhibiters; and said first bracket including an outwardly projecting tongue configured for fastening to the utility pole.

10. A brace arm for connection to a crossarm of a utility pole, the brace arm comprising;

an elongated strut having a first end and a second end substantially opposite said first end, said first end and said second end each defining a receptacle therein;

a first bracket constructed of polymeric material attached to said first end, said first bracket including a skirt portion generally surrounding said first end and defining an integral projection extending into and substantially filling said receptacle in said first end of said strut, and said polymeric material being injection grade thermoplastic having ultraviolet inhibiters; and said first bracket including an outwardly projecting tongue configured for fastening to the utility pole.

11. The brace arm as defined in claim 10, further comprising a second bracket constructed of polymeric material molded to said second end of said strut, said second bracket defining an integral projection extending into and substantially filling said receptacle in said second end of said strut.

12. The brace arm as defined in claim 10, further comprising a fastener, and wherein said tongue defines a fastener hole for receipt of said fastener.

13. The brace arm as defined in claim 10, wherein said first bracket defines an end face having a midline portion, and wherein said tongue is connected to said end face generally along said midline portion.

14. The brace arm as defined in claim 10, wherein said strut is constructed of wood.

15. The brace arm as defined in claim 10, wherein said polymeric material is injection grade thermoplastic.

16. A brace arm for connection to a crossarm of a utility pole, the brace arm comprising:

an elongated strut having a first end and a second end substantially opposite said first end, said first end and said second end each defining a receptacle therein;

a first bracket constructed of polymeric material molded to said first end, said first bracket including a skirt portion generally surrounding said first end of said strut and defining an integral projection extending into and substantially filling said receptacle in said first end of said strut; and said first bracket including an outwardly projecting tongue configured for fastening to the utility pole; and wherein said polymeric material is injection grade thermoplastic having ultraviolet inhibiters.

17. A brace arm for bracing an object, comprising:

an elongated wooden strut having a first end and a second end substantially opposite said first end, said first end and said second end each defining a receptacle therein;

a first bracket constructed of polymeric material attached to said first end, said first bracket including a skirt portion generally surrounding said first end of said strut and defining an integral projection extending into said receptacle in said first end of said strut, and said polymeric material being injection grade thermoplastic having ultraviolet inhibiters; and a second bracket constructed of polymeric material molded to said second end of said strut, said second bracket defining an integral projection extending into said receptacle in said second end of said strut; and said first bracket including an outwardly projecting tongue configured for fastening to the object.

18. A brace arm for bracing an object, comprising:

an elongated wooden strut having an end portion;

a bracket constructed of polymeric material attached to said end, said bracket including a skirt portion generally surrounding said end portion; said skirt portion defining an integral projection connected to and extending through a substantial portion of said end portion; and said polymeric material being injection grade thermoplastic having ultraviolet inhibiters; and said bracket including an attachment portion configured for fastening said bracket to the object.

19. A brace arm for connection to a crossarm of a utility pole, the brace arm comprising:

an elongated non-metallic strut having a first end and a second end substantially opposite said first end;

a bracket constructed of polymeric material attached to said first end of said strut, said bracket including a skirt portion generally surrounding said first end; said skirt portion defining an integral projection connected to and extending through a substantial portion of said first end of said strut; said polymeric material having ultraviolet inhibiters; and said bracket including an outwardly projecting tongue configured for fastening to the utility pole.

20. A brace arm for connection to a crossarm of a utility pole, the brace arm comprising:

an elongated strut having a first end and a second end, said first end defining a receptacle therein; and a bracket constructed of polymeric material attached to said first end, said bracket including a skirt portion generally surrounding said first end of said strut; said skirt portion defining a projection extending into said receptacle in said first end of said strut, and said polymeric material having ultraviolet inhibiters.

21. A brace arm for connection to a crossarm of a utility pole, the brace arm comprising:

an elongated strut having a first end and a second end, said first end defining a receptacle therein;

a bracket constructed of polymeric material attached to said first end, said bracket including a skirt portion generally surrounding said first end of said strut; said skirt portion defining a projection extending into said receptacle in said first end of said strut, and said polymeric material having ultraviolet inhibiters; and said bracket including an elongated member configured for fastening to the utility pole, said elongated member extending at an acute angle with respect to the brace arm.

22. A brace arm for connection to a crossarm of a utility pole, the brace arm comprising:

an elongated strut having a first end and a second end, said first end defining a receptacle therein;

a bracket constructed of polymeric material, said bracket including a skirt portion generally surrounding said first end of said strut; said skirt portion defining a projection extending into said receptacle in said first end of said strut;

said bracket including a member configured for fastening to the utility pole; and said bracket and said projection being formed by injection molding said polymeric material onto said first end of said elongated strut.

23. A brace arm for connection to a crossarm of a utility pole, the brace arm comprising:

an elongated wooden strut having a first end and a second end, said first end defining a receptacle therein;

a bracket constructed of polymeric material, said bracket including a skirt portion generally surrounding said first end of said strut; said skirt portion defining a projection extending into said receptacle in said first end of said strut;

said bracket including a member configured for fastening to the utility pole; and said bracket and said projection being formed by injection molding said polymeric material onto said first end of said elongated strut.

24. A utility line support device for supporting a utility line above the ground, comprising:

a pole member for placement in the ground;

a crossarm attached to and extending outwardly from the pole member for carrying the utility line;

at least one elongated brace arm spanning between said pole and said crossarm, said brace arm having a first end and a second end opposite said first end;

a first bracket constructed of polymeric material attached to said first end of said brace arm, said first bracket being connected to said pole, and said polymeric material being injection grade thermoplastic having ultraviolet inhibiters;

said first bracket including a skirt portion generally surrounding said first end of said brace arm;

said first end of said brace arm including a first surface and a second surface opposite to said first surface;

said skirt defining a first side adjacent said first surface, and a second side adjacent said second surface;

said first end of said brace arm defining a passage extending from said first surface to said second surface; and said skirt defining an integral projection connected to and spanning between said first side and said second side of said skirt and extending through said passage of said first end of said brace arm.

* * * * *